US006429791B2

(12) United States Patent
Quinn

(10) Patent No.: US 6,429,791 B2
(45) Date of Patent: Aug. 6, 2002

(54) PARKED VEHICLE LOCATOR

(76) Inventor: Sharon Quinn, P.O. Box 714, Ridgewood, MD (US) 21139

(*) Notice: Subject to any disclaimer, the term of this patent is extended or adjusted under 35 U.S.C. 154(b) by 0 days.

(21) Appl. No.: 09/800,299

(22) Filed: Mar. 6, 2001

Related U.S. Application Data

(60) Provisional application No. 60/194,153, filed on Apr. 3, 2000.

(51) Int. Cl.[7] .................................................. B60Q 1/48

(52) U.S. Cl. ................ 340/932.2; 340/539; 340/815.53

(58) Field of Search ............................. 340/539, 932.2, 340/902, 904, 815.4, 815.53, 815.64, 815.69, 815.86; 705/418, 13; 368/90, 78

(56) References Cited

U.S. PATENT DOCUMENTS

| | | | | | |
|---|---|---|---|---|---|
| 3,702,531 | A | * | 11/1972 | Maue | 368/78 |
| 4,379,334 | A | * | 4/1983 | Feagins, Jr. et al. | 705/418 |
| 4,460,965 | A | * | 7/1984 | Trehn et al. | 705/418 |
| 4,879,553 | A | | 11/1989 | Righi | 340/932.2 |
| 4,990,757 | A | | 2/1991 | Edwards et al. | 235/384 |
| D321,865 | S | | 11/1991 | Derocher | D14/345 |
| 5,278,556 | A | | 1/1994 | Oh | 340/988 |
| 5,710,557 | A | | 1/1998 | Schutte | 340/932.2 |
| 5,751,973 | A | * | 5/1998 | Hassett | 705/13 |
| D413,582 | S | | 9/1999 | Tompkins | D14/344 |
| 6,188,328 | B1 | * | 2/2001 | Ho | 340/932.2 |
| 6,249,233 | B1 | * | 6/2001 | Rosenberg et al. | 340/932.2 |

FOREIGN PATENT DOCUMENTS

| | | | |
|---|---|---|---|
| SE | WO 93/20539 | * | 10/1993 |

* cited by examiner

*Primary Examiner*—Van Trieu
(74) *Attorney, Agent, or Firm*—Richard C. Litman

(57) ABSTRACT

A hand-held device which is used to record the site of a vehicle that is parked in a marked location in a lot or garage. The device may be applied to record the level, section and row in which the vehicle is parked. An array of alpha-numeric indicia is adaptable to accurately record almost any parking scheme. The device may be either electronic or mechanical.

9 Claims, 4 Drawing Sheets

PARKED VEHICLE LOCATOR

CROSS-REFERENCE TO RELATED APPLICATION

This application claims the benefit of U.S. Provisional Patent Application Ser. No. 60/194,153, filed Apr. 3, 2000.

BACKGROUND OF THE INVENTION

1. Field of the Invention

The present invention generally relates to locator devices. More specifically, the present invention is drawn to a device for recording the location of a parked vehicle in large parking facilities.

2. Description of Related Art

Urban sprawl and reliance on the automobile has created a situation dominated by multi-acre parking lots at ever-popular shopping malls and self-parking, multi-storied parking garages in downtown areas, train depots, hospitals, etc. Finding your parked vehicle in a parking lot or garage is often a daunting task especially if you have forgotten the section, row and/or level where your vehicle is parked. An inexpensive, uncomplicated device that would allow one to easily record the exact location of the parked vehicle would certainly be a welcome advance in the art.

The prior art abounds with devices for the general recording of notes and/or data. For example, U.S. Pat. Nos. Des. 321,865 (Derocher) and Des. 413,582 (Tompkins) show designs for electronic note pads. These devices are utilized to record general data and are relatively expensive. Further, devices of this type are large and cumbersome when compared to the invention as contemplated by Applicant.

U.S. Pat. No. 4,879,553 (Righi) is drawn to a tele-control system for a motor vehicle. The above system requires extensive electronic wiring of the motor vehicle.

U.S. Pat. No. 4,990,757 (Edwards et al.) and U.S. Pat. No. 5,710,557 (Schuette) disclose electronic identifiers for assisting the retrieval of motor vehicles at valet-operated parking facilities.

U.S. Pat. No. 5,278,556 (Oh) shows a remote-controlled, light-emitting, alarm system for locating a parked vehicle. The instant system requires that a receiver is placed in the vehicle for activation by a hand-carried transmitter.

None of the above inventions and patents, taken either singly or in combination, is seen to disclose a device for recording the location of a parked motor vehicle as will be subsequently described and claimed in the instant invention.

SUMMARY OF THE INVENTION

The present invention, to be dubbed "Park & Find", is a hand-held device which allows a user to easily record the site of a vehicle that is parked in a marked location in a lot or garage. A user may apply the device to record the level, section and row in which the vehicle is parked. Park & Find is small enough to be attached to a key chain, pocketbook, briefcase, etc. The device is provided with alpha and numerical characters so as to be adaptable to accurately record almost any marking scheme. As contemplated, Park & Find may be either electronically or mechanically operated. Optional features such as an emergency alarm, a vehicle identification signal and a voice activated recording system may be incorporated in the electronic embodiment of the device.

Accordingly, it is a principal object of the invention to provide a hand-held device to permit a user to determine the location of a parked motor vehicle.

It is another object of the invention to provide a hand-held device for recording the location of a parked motor vehicle.

It is a further object of the invention to provide a hand-held device for recording the location of a parked motor vehicle, which device is available either for electronic or mechanical operation.

Still another object of the invention is to provide a hand-held device for recording the location of a parked vehicle, which device is easy to use.

It is an object of the invention to provide improved elements in and arrangements thereof in a device for the purposes described which are inexpensive, dependable and fully effective in accomplishing their intended purposes.

These and other objects of the present invention will become readily apparent upon further review of the following specification and drawing.

BRIEF DESCRIPTION OF THE DRAWINGS

Similar characters denote corresponding features consistently throughout the attached drawings.

DETAILED DESCRIPTION OF THE PREFERRED EMBODIMENTS

Figure 1:
FIG. 1 is an environmental, perspective view of a locator device according to the present invention.

As shown in FIG. 1, a user P may employ the locator device, generally indicated at 10, to record the site indicia 12 of a parking space. In so recording the indicia, the user will not have to rely on memory to recall the location of the site. All that will be required is a quick glance at the settings recorded in locator 10.

Figure 2:
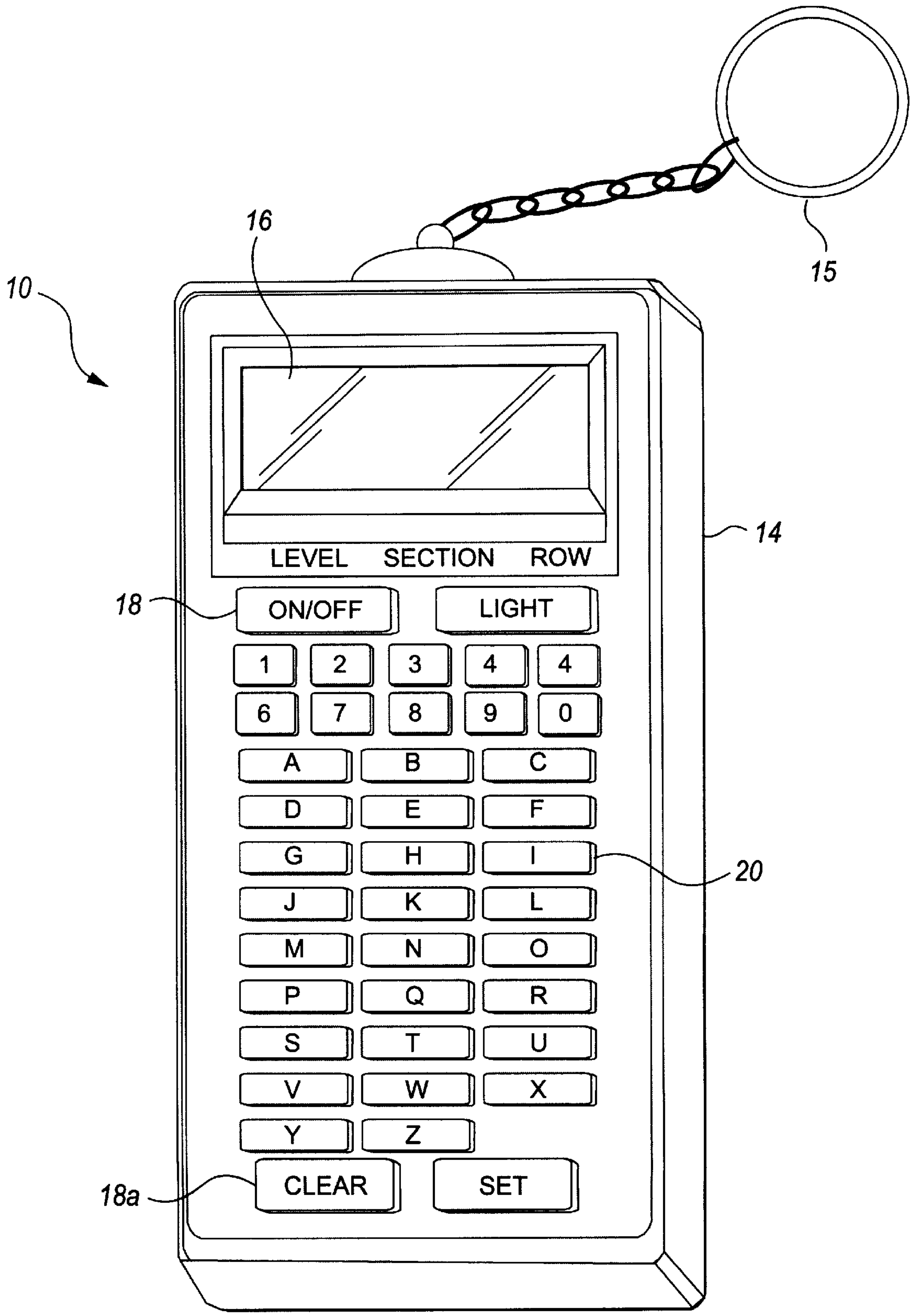
FIG. 2 is a perspective view of an electronic embodiment of a locator device according to the present invention.
Figure 3:
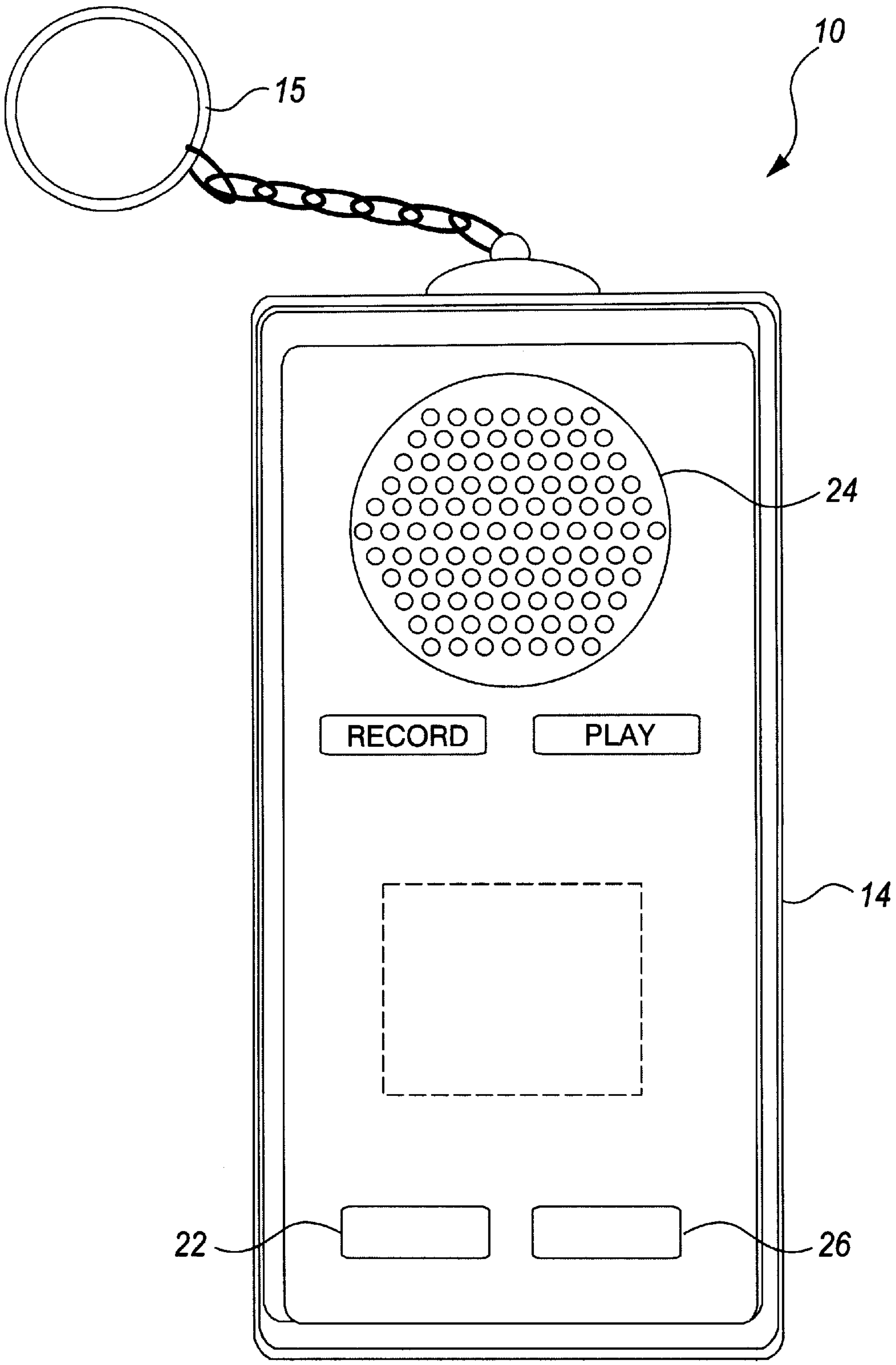
FIG. 3 is a rear view of the embodiment shown in FIG. 2 according to the present invention.

Attention is directed to FIGS. 2 and 3 which best illustrate the structure of the locator in its electronic embodiment. The hand-held electronic embodiment comprises a casing 14 fabricated from a suitable plastic material (a metallic material can be used if desired). As contemplated, casing 14 will be about one inch wide, two and one-half inches long and one-fourth of an inch thick. A key ring 15 is provided at one end of casing 14 so that the casing may easily be attached to a set of keys, a pocketbook, etc. The casing has a front face which includes a readout section 16, control sections 18, 18*a* and alpha-numeric input section 20. Light and on/off switches are provided in section 18. Clear and set switches are disposed in section 18*a*. The functions of the switches are explained below. The rear face of casing 14 (FIG. 3) includes an emergency button 22 which is used to activate an audible alarm in the event of an emergency. Also provided is a voice activated recording/playback device 24 that will allow a user to orally record the vehicle site location for playback when needed. Button 26 will remotely activate a signal device (not shown) that is placed in the parked vehicle. The signal device is designed to emit audible beeps in a sound pattern which is unique to the particular vehicle and would provide a further assist in determining the vehicles location. As contemplated, emergency button 22, recording/playback device 24 and signal button 26 are optional features to be incorporated as desired. A replaceable cell battery and electronic circuit 25 (shown in phantom lines) are housed in casing 14 and are employed to power the elements of locator 10. The battery and circuitry are conventional and are not, per se, part of the inventive concept.

To operate the electronic device merely requires a user to activate the on/off switch to the on position and manipulate the proper alpha-numeric keys so that the required site data appears in readout section 16. After the correct site indicia have been recorded, manipulation of the set switch will lock the site information in the readout section. Entries can be erased by pressing the clear switch. If illumination is needed, a light in the casing may be turned on by pressing the light switch.

Figure 4:
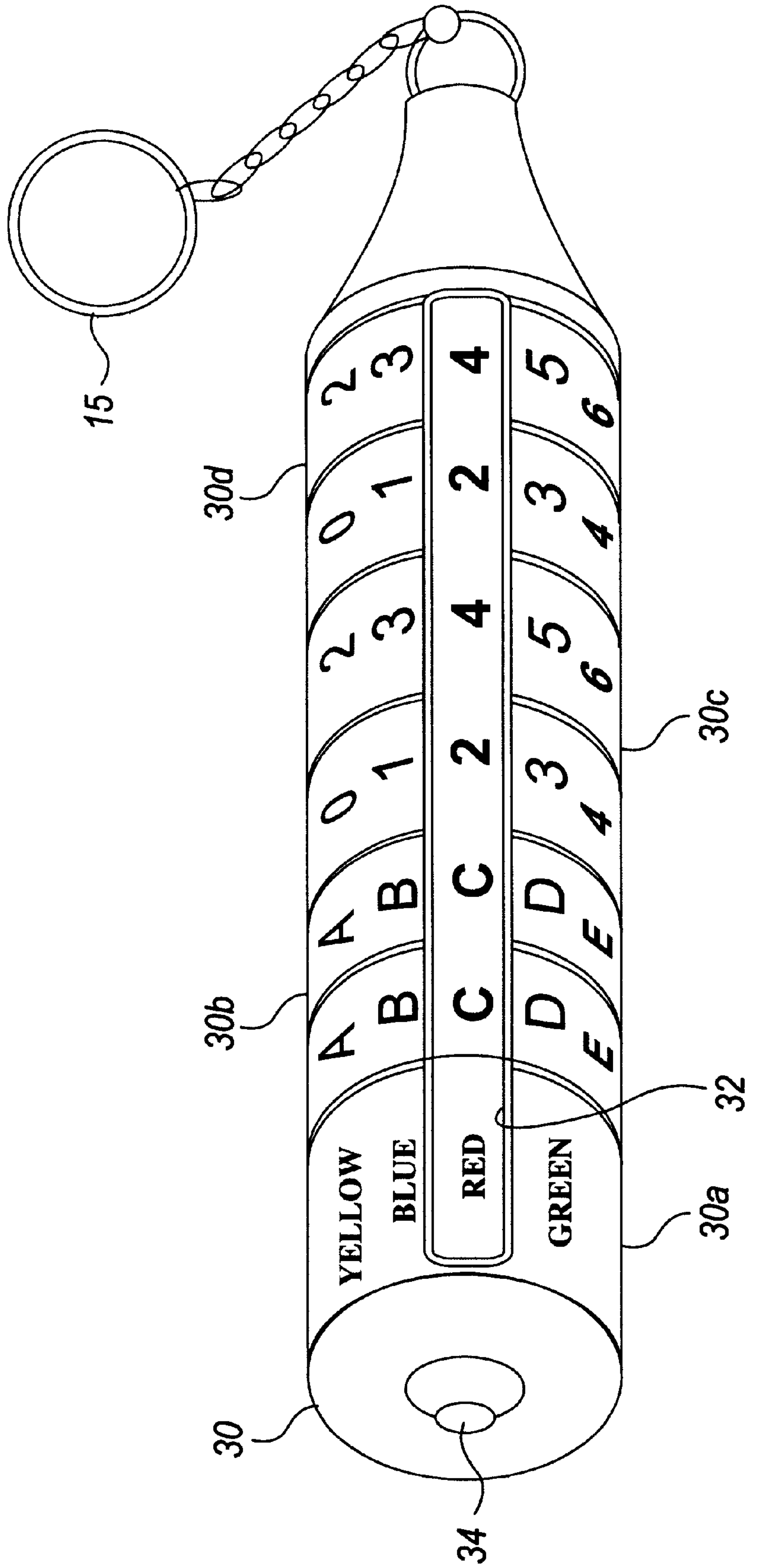
FIG. 4 is a perspective view of a mechanical embodiment of a locator device according to the present invention.

FIG. 4 illustrates a second embodiment of the invention which employs no electronic circuitry. The instant embodiment comprises a cylindrical body 30 fabricated from a plastic or metallic material. Body 30 is about two inches long with a diameter of about three-fourths of an inch as presently contemplated. Four tumblers 30*a*, 30*b*, 30*c*, 30*d* are rotatable about the central axis of the cylindrical body 30. Tumbler 30*a* is inscribed with the names of standard colors evenly spaced around the circumference thereof. Tumbler 30*b* has alpha indicia inscribed there around. Tumblers 30*c* and 30*d* are both inscribed with numeric indicia. An alignment window 32 is disposed along the surface of body 30 and is attached to the body at each end in any suitable and convenient manner. To enhance viewing, window 32 is fabricated from a material which will magnify the indicia appearing thereunder. A key ring 15 is secured at one end of the body for purposes as indicated above. A mechanism 34 is mounted at the other end of body 30 to lock the tumblers to prevent rotation. Mechanism 34 can also be manipulated to release the tumblers for rotation when desired.

To operate the device of FIG. 4, a user simply rotates the tumblers until the correct level, section and row are positioned under alignment window 32. The tumblers are then locked against rotation so that the user can quickly ascertain the site location by merely glancing at the locator device.

It is to be understood that the present invention is not limited to the embodiments described above, but encompass any and all embodiments within the scope of the following claims.

I claim:

1. A hand-held device for recording the site location of a parked motor vehicle, said device comprising:

a body member, said body member having a front face, a rear face, a first end and a second end;

a viewing area disposed on said front face at a first portion of said body member;

an array of alpha-numeric indicia disposed on said front face at a second portion of said body member;

first means for positioning selected ones of said alphanumeric indicia from said second portion of said body member at said viewing area;

a set switch disposed on said body member for locking said selected ones of said alpha-numeric indicia at said viewing area;

a recording and play-back device, said recording and play-back device disposed in said rear face of said body member; and an emergency button for activating an audible alarm, said emergency button disposed on said rear face of said body member.

2. The device according to claim 1, wherein a plurality of push-buttons is disposed on said front face adjacent said second end, said array of alpha-numeric indicia being individually inscribed on a respective push-button.

3. The device according to claim 2, wherein said first means for positioning includes a battery powered electronic circuit.

4. The device according to claim 3, including a clear switch for deleting said selected ones of said alpha-numeric indicia from said viewing area, said clear switch disposed on said front face.

5. The device according to claim 4, wherein said body member is fabricated from plastic material.

6. The device according to claim 5, including a key chain attached at said first end.

7. A device for recording the site location of a parked motor vehicle, said device comprising:

a body member, said body member having a cylindrical configuration with a longitudinal axis and a circumferential surface area;

a viewing area including an alignment window disposed at a first portion of said body member adjacent said circumferential surface area;

an array of alpha-numeric indicia disposed on said circumferential surface area;

first means for manually positioning selected ones of said alpha-numeric indicia at said viewing area; and a set mechanism for locking said selected ones of said alpha-numeric indicia at said viewing area.

8. The device according to claim 7, wherein said first means for positioning includes a plurality of tumblers rotatable around said longitudinal axis.

9. The device according to claim 8, wherein said body member has a free end and a key chain attached to said free end.

* * * * *